United States Patent
Brady et al.

(10) Patent No.: US 8,120,867 B2
(45) Date of Patent: Feb. 21, 2012

(54) APPARATUS AND METHODS OF GENERATING A TEST PATTERN OF DATA, ANALYSING A TEST PATTERN OF DATA, AND TESTING A DATA STORAGE DISK MEDIUM AND/OR A READ/WRITE HEAD

(75) Inventors: Keith Rowland Charles Brady, Hampshire (GB); Gregory Martin Quick, Hampshire (GB); Paul Harvey Ronald Jolly, Hampshire (GB)

(73) Assignees: Xyratex Technology Limited, Havant (GB); Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/600,370

(22) PCT Filed: May 15, 2008
(Under 37 CFR 1.47)

(86) PCT No.: PCT/EP2008/055988
§ 371 (c)(1),
(2), (4) Date: Aug. 13, 2010

(87) PCT Pub. No.: WO2008/142004
PCT Pub. Date: Nov. 27, 2008

(65) Prior Publication Data
US 2011/0032631 A1    Feb. 10, 2011

Related U.S. Application Data

(60) Provisional application No. 60/938,787, filed on May 18, 2007.

(51) Int. Cl.
*G11B 27/36* (2006.01)
*G11B 5/02* (2006.01)

(52) U.S. Cl. ............................................. 360/31; 360/51
(58) Field of Classification Search .................... None
See application file for complete search history.

(56) References Cited

U.S. PATENT DOCUMENTS

| 5,477,103 | A | 12/1995 | Romano et al. |
|---|---|---|---|
| 5,754,353 | A * | 5/1998 | Behrens et al. ................. 360/53 |
| 6,894,489 | B2 * | 5/2005 | Makuuchi et al. ............ 324/212 |
| 7,126,776 | B1 | 10/2006 | Warren, Jr. et al. |
| 2006/0176599 | A1 * | 8/2006 | Semba ............................ 360/51 |

FOREIGN PATENT DOCUMENTS

| EP | 1 182 656 A2 | 8/2001 |
|---|---|---|
| JP | 08031124 A * | 2/1996 |

OTHER PUBLICATIONS

International Search Report for PCT/EP2008/055988, Sep. 22, 2008.

* cited by examiner

*Primary Examiner* — Daniell L Negron
*Assistant Examiner* — Regina N Holder
(74) *Attorney, Agent, or Firm* — Pillsbury Winthrop Shaw Pittman LLP

(57) ABSTRACT

A method of generating a test pattern of data to be written to a data storage disk medium for testing includes: rotating the disk; detecting fluctuations in the speed of rotation of the disk; producing a reference clock signal in accordance with the fluctuations so as to be synchronized with the rotation of the disk; and, generating a test pattern of data using the reference clock signal as a timing reference. An apparatus for generating a test pattern of data includes a spindle for rotating a disk; a detector arranged to detect fluctuations in the speed of rotation of the disk; a processor arranged to produce a reference clock signal in accordance with fluctuations so as to be synchronized with the rotation of the disk; and, a pattern generator arranged to generate a test pattern of data using the reference clock signal as a timing reference.

13 Claims, 2 Drawing Sheets

Figure 1:
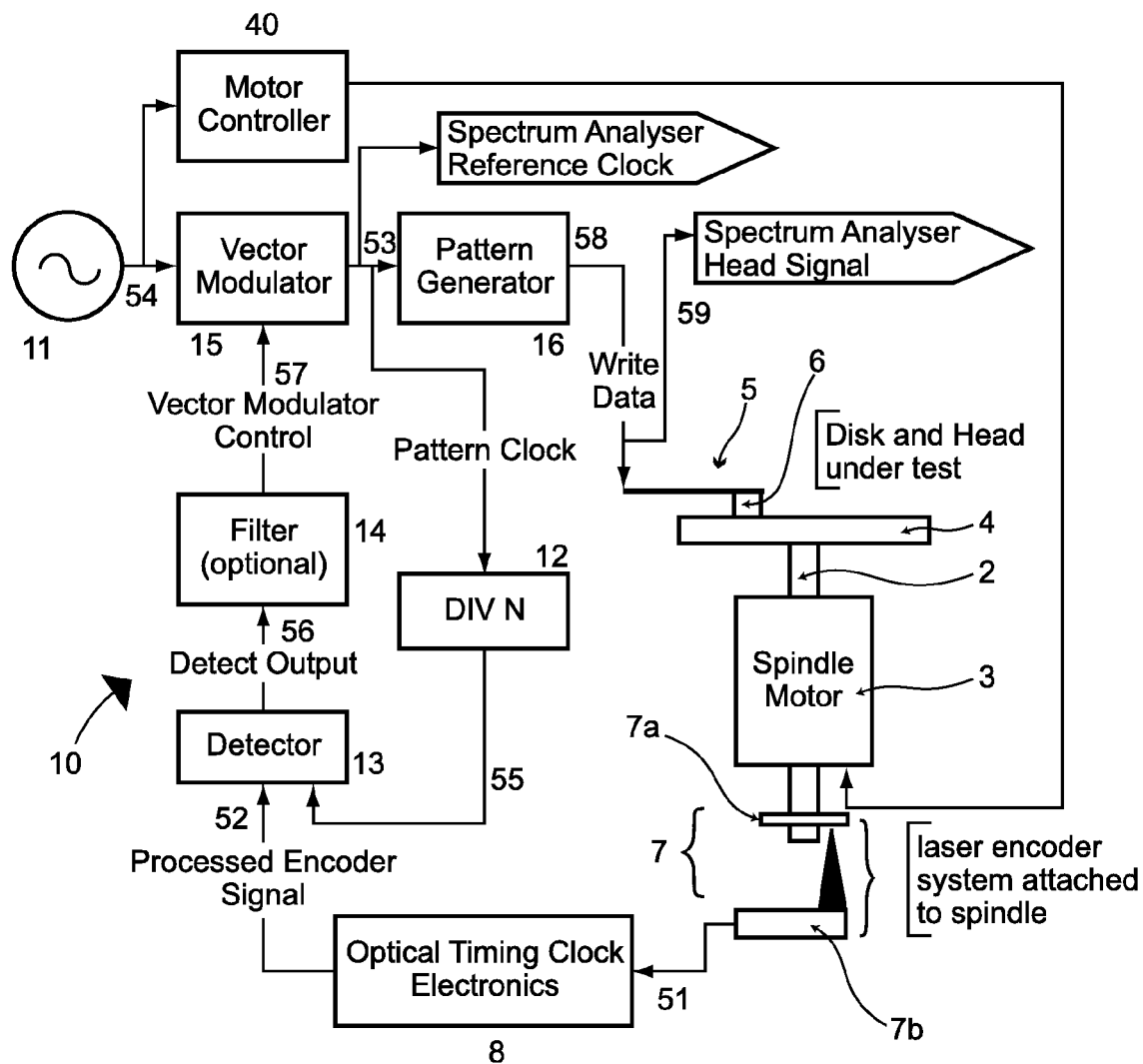

APPARATUS AND METHODS OF GENERATING A TEST PATTERN OF DATA, ANALYSING A TEST PATTERN OF DATA, AND TESTING A DATA STORAGE DISK MEDIUM AND/OR A READ/WRITE HEAD

The present invention relates to apparatus and methods of generating a test pattern of data, analysing a test pattern of data, and testing a data storage disk medium and/or a read/write head.

In embodiments, the present invention relates generally to head media test apparatus such as are commonly known as "spinstands" or "dynamic electrical test machines" in the art. Spinstands were first developed in the art as a tool for use during research and development to allow the performance of the various components of disk drives, for example the heads, disks and channels, to be evaluated and optimised. It is now common to also use spinstands in the field of disk drive manufacturing to test each manufactured read/write head or disk before it is assembled into a disk drive unit.

A typical spinstand comprises a motor-driven spindle on which a disk to be tested can be mounted and spun, and a head load mechanism for holding and positioning the read/write head to be tested. The spinstand also comprises a spinstand controller under the control of which the head is "flown" over the surface of the disk when spun, so that test data can be written to and read from the disk with the head. When conducting a test with a spinstand, the head is first positioned over a track on the disk and test data is written to the track. The test data is subsequently read back by the head, measured, and analysed and the results then displayed to the user. Various parameters under which the data is written and/or read back can be controlled and varied by the spinstand, allowing the performance and characteristics of the head or disk to be investigated under various conditions. Usually, a computer or similar processing apparatus is provided to carry out the various tests performed on the spinstand, and to analyse and display the measurements made with the spinstand. Additionally, dedicated parametric measurement electronics, a spectrum analyser or an oscilloscope may be provided for analysing and displaying the measurements made with the spinstand. In this way a series of tests may be conducted, including for example so-called bit error rate (BER) bathtubs, track squeeze, track centre, read/write offset, overwrite, etc.

One possible source of error in testing is due to fluctuations in the speed of rotation of the disk. A highly accurate motor is usually used to rotate the spindle and thereby the disk attached to the spindle. Nevertheless, the motor speed can only be controlled to within a certain tolerance, giving rise to undesired fluctuations in the rotational speed of the disk. Such fluctuations cause the test data pattern to be distorted both when being written to the disk as well as when being read back from the disk. These distortions can cause significant problems in performing tests where high precision is required.

According to a first aspect of the present invention, there is provided a method of generating a test pattern of data to be written to a data storage disk medium for testing, the method comprising: rotating the disk; detecting fluctuations in the speed of rotation of the disk; producing a reference clock signal in accordance with said fluctuations so as to be synchronised with the rotation of the disk; and, generating a test pattern of data using said reference clock signal as a timing reference.

By producing a reference clock signal that is synchronised with the rotation of the disk and using this to generate a test pattern of data, it is possible to generate a test pattern that accounts or allows for fluctuations in the rotation of the disk such that when the test pattern is written to the disk, it is spatially correct with respect to the surface of the disk. This means that the data can be read back and the signal obtained will be a truer representation of the original test pattern of data.

For example, where a test frequency is written to a track on the disk, in prior art arrangements the test frequency actually present on the disk will vary to some degree along the track, meaning that the recovered frequency will also be spread, leading to loss of accuracy in measuring the signal. In contrast, this aspect of the present invention allows the frequency to be modulated to accommodate the rotational error of the disk, thereby making the written frequency pattern more spatially correct on the disk so that the signal read back from the disk will be less spread. This means that detecting the frequency in the read back signal will be simpler as the frequency power will be more sharply concentrated about the correct frequency and less spread.

In a preferred embodiment, the step of detecting the fluctuations comprises: detecting a plurality of marks that rotate synchronously with the disk; and, producing a clock signal corresponding to the movement of the detected marks, said clock signal being used in the production of the reference clock signal. This arrangement provides a preferred method of measuring the fluctuations in the rotation of the disk to allow the reference clock signal to be produced. The marks may be optical marks that are read using laser interferometry. The optical marks may be attached to the disk itself or to the spindle or to any other part that rotates with the disk. Alternatively, the marks may be magnetic marks on the disk that are detected magnetically. It is generally preferred to have many marks, to allow a higher resolution in determining the fluctuations in the rotation of the disk.

In a preferred embodiment, the method comprises providing the clock signal as an input to a phase locked loop, the phase locked loop being arranged to produce said reference clock signal. This provides a simple way of producing the reference clock signal. Using a phase locked loop allows the production of the reference signal to be tailored to suit the application according to the well known principles governing the operation of phase locked loops.

In an embodiment, the method comprises producing an oscillator clock signal from an oscillator; the disk being rotated with a motor that is locked to the oscillator clock signal; and, the reference clock signal being generated using the oscillator clock signal, the oscillator clock signal being modulated in accordance with the fluctuations in the speed of rotation of the disk in the generation of the reference clock signal. In effect, in this embodiment one oscillator is used to produce the reference clock and to clock the motor. If separate clocks were used for each, then thermal drift could cause the clocks to drift with respect to each other, which would have the effect of introducing phase error in the pattern written to the disk. Having one clock for both has the advantage of substantially eliminating this error.

The method may comprise rotating the disk; detecting fluctuations in the speed of rotation of the disk; producing a reference clock signal in accordance with said fluctuations so as to be synchronised with the rotation of the disk; reading a test pattern of data from the disk to provide a test data signal; and, analysing said test data signal using the reference clock signal as a timing reference. This arrangement provides a preferred phase locked loop architecture. The divide-by-n counter means that the reference clock signal can be at a different frequency from the clock signal.

According to a second aspect of the present invention, there is provided a method of analysing a test pattern of data read from a data storage disk medium, the method comprising: rotating the disk; detecting fluctuations in the speed of rotation of the disk; producing a reference clock signal in accordance with said fluctuations so as to be synchronised with the rotation of the disk; reading a test pattern of data from the disk to provide a test data signal; and, analysing said test data signal using the reference clock signal as a timing reference.

By producing a reference clock signal that is synchronised with the rotation of the disk and using this to analyse the test data signal, it is possible to account or allow for fluctuations in the rotation of the disk when reading back the data. This makes analysing the data more simple and improves the accuracy of the results.

For example, where a test frequency is written to a track on the disk, in prior art arrangements the recovered test data signal read from the disk will be distorted due to the fluctuations in rotation of the disk, meaning that the recovered frequency will be frequency spread, leading to difficulties in measuring the signal. In contrast, this aspect allows the recovered data test signal to be demodulated with the rotational error of the disk, rejecting fluctuations in the speed of rotation of the disk, so that the analysis of the signal read back from the disk will be less affected by frequency spreading. This means that detecting the frequency in the read back signal will be simpler as the frequency power will be more sharply concentrated about the correct frequency and less spread.

The step of analysing may comprise spectrum analysing said test data signal. As discussed below, the present arrangement has particular advantages when used in narrow band measurement tests.

The step of spectrum analysing may comprise converting said test data signal to an intermediate frequency by mixing said test data signal with a sinusoidal signal generated using said reference clock as a timing reference. This arrangement allows a more accurate super-heterodyning operation to be carried out on the data signal as part of a spectrum analysing test and allows the spectrum analyser to become normalised to disk speed.

The step of spectrum analysing may comprise sampling and digitising the test data signal using an analogue-to-digital converter that is clocked by the reference clock. This allows the spectrum analyser to become normalised to disk speed. The present arrangement can also be used in a spectrum analyser that performs some or all of the spectrum analysis digitally.

According to a third aspect of the present invention, there is provided a method of testing at least one of a data storage disk medium and a read/write head, the method comprising: rotating the disk; detecting fluctuations in the speed of rotation of the disk; producing a reference clock signal in accordance with said fluctuations so as to be synchronised with the rotation of the disk; generating a test pattern of data using said reference clock signal as a timing reference; writing the test pattern of data to the disk with the head; reading the test pattern of data from the disk with the head to provide a test data signal; and, analysing said test data signal using the reference clock signal as a timing reference.

This provides a more accurate method of testing by utilising both methods described above. The reference clock signal is used both when generating the pattern of data to be written to the disk to compensate for fluctuations in the disk rotation and also when analysing the data signal read back from the disk to compensate for fluctuations in the disk rotation.

In an embodiment, the method comprises: 1) the disk being rotated by a motor that is locked to an oscillator clock signal; and, 2) the reference clock signal being provided from an oscillator clock signal, the oscillator clock signal being modulated in accordance with the fluctuations in the speed of rotation of the disk in the production of the reference clock signal, wherein the same oscillator clock signal is used for steps 1) and 2). In this arrangement, a single oscillator clock is used as reference for the entire testing apparatus rather than having separate oscillator clocks in the apparatus. This avoids the effects of thermal drift which typically arise over time between two separate clocks, and therefore helps avoid a source of error entering the system, both when writing data to the disk and when reading back and analysing data from the disk.

According to a fourth aspect of the present invention, there is provided apparatus for generating a test pattern of data to be written to a data storage disk medium for testing, the apparatus comprising: a spindle for rotating a said disk; a detector arranged to detect fluctuations in the speed of rotation of the disk; a processor arranged to produce a reference clock signal in accordance with said fluctuations so as to be synchronised with the rotation of the disk; and, a pattern generator arranged to generate a test pattern of data using said reference clock signal as a timing reference.

According to a fifth aspect of the present invention, there is provided apparatus for analysing a test pattern of data read from a data storage disk medium, the apparatus comprising: a spindle for rotating a said disk; a detector arranged to detect fluctuations in the speed of rotation of the disk; a processor arranged to produce a reference clock signal in accordance with said fluctuations so as to be synchronised with the rotation of the disk; a controller arranged to read a test pattern of data from the disk to provide a test data signal; and, an analyser arranged to analyse the test data signal using the reference clock signal as a timing reference.

According to a sixth aspect of the present invention, there is provided apparatus for testing at least one of a data storage disk medium and a read/write head, the apparatus comprising: a spindle for rotating a said disk; a detector arranged to detect fluctuations in the speed of rotation of the disk; a processor arranged to produce a reference clock signal in accordance with said fluctuations so as to be synchronised with the rotation of the disk; a pattern generator arranged to generate a test pattern of data using said reference clock signal as a timing reference; a controller arranged to write the test pattern of data to the disk with a said head, and to subsequently read a test data from the disk with the head to provide a test data signal; and, an analyser arranged to analyse the test data signal using the reference clock signal as a timing reference.

Figure 2:
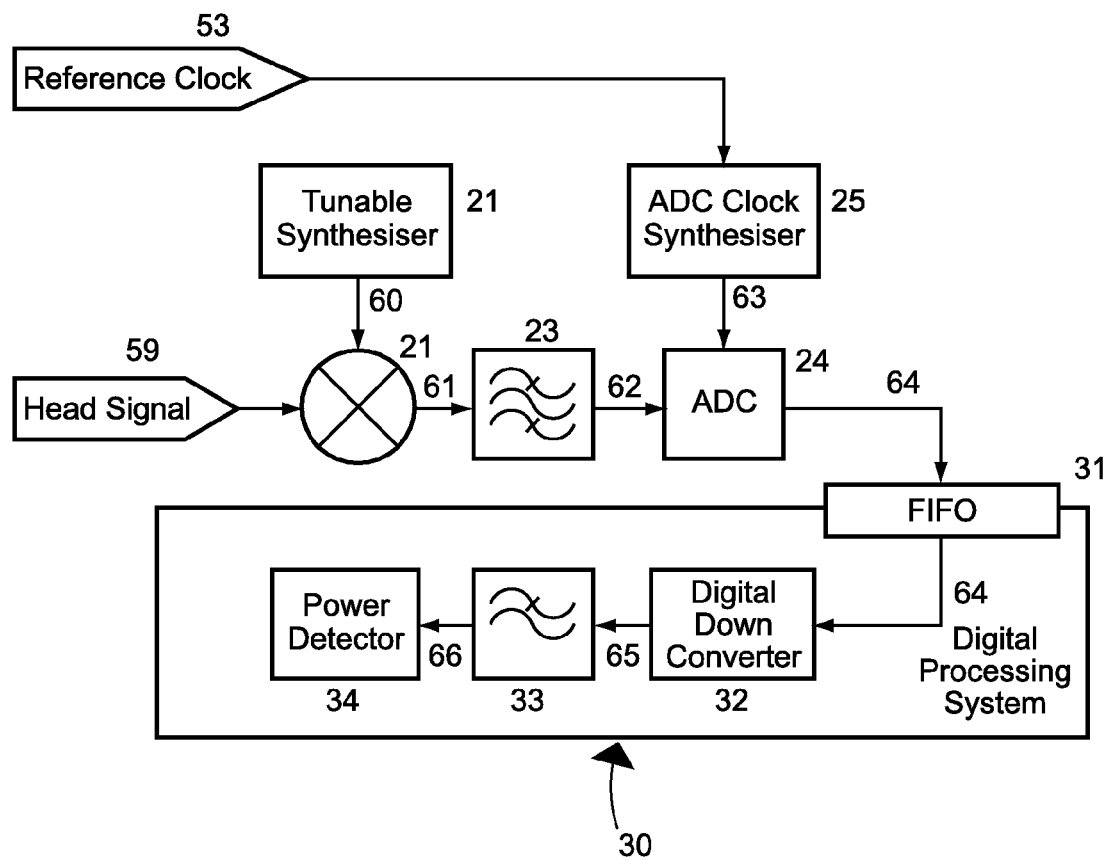

Embodiments of the present invention will now be described by way of example with reference to the accompanying drawings, in which:

FIG. 1 shows schematically an example of a spinstand according to an embodiment of the present invention; and, FIG. 2 shows schematically an example of a spectrum analyser to be used in conjunction with the spinstand of FIG. 1.

Referring to FIG. 1, a spinstand 1 comprises an air-bearing spindle 2 driven by a motor 3 to which a disk 4 is mounted. The spinstand 1 also has a head load mechanism (not shown) for holding a head gimbal assembly 5 and positioning the read/write head 6 of the head gimbal assembly 5 over the surface of the disk 4 such that data can be written to and read from a track on the surface of the disk 4. As described thus far, the spinstand 1 is of a known type.

The spinstand 1 has a laser encoder system 7 associated with its spindle 2 to allow the position of the spindle 2 to be accurately determined. The principles of a laser encoder system 7 are generally well known in the art and therefore will not be described in detail herein. In particular, suitable laser encoder systems 7 have been developed for use with servo track writing machines, where they are used to allow successively written servo tracks to be kept in the correct phase with each other with the necessary high degree of accuracy. Nevertheless in brief, the spindle has an encoder scale 7a attached thereto at its end opposite the disk 4. The scale 7a comprises a diffraction grating, i.e. a series of transitions from black to white, arranged in a ring positioned to be concentric with the axis of the spindle 2. There are preferably at least thousands of such transitions around the ring, and possibly millions of transitions. The transitions preferably occur with an equiangular spacing around the ring.

A grating interferometer 7b is mounted to the spinstand 1 for reading the scale 7a on the spindle 2. The interferometer 7b has a laser (not specifically shown) which is directed onto the scale 7a to allow the transitions in the scale 7a to be detected by a detector (not specifically shown) in the interferometer 7b as they move past the laser. In this way the laser encoder system 7 produces a raw encoder signal 51 measuring the detected scale 7a.

The raw encoder signal 51 is passed to optical timing clock electronics 8 which are arranged to process the raw encoder signal 51 to produce a processed encoder signal in the form of a clock signal 52 whose edges correspond to the detected transitions of the scale 7a.

It should be noted that other arrangements are possible for measuring fluctuations in the rotation of the disk 4. For example, the scale 7a can be attached to the disk 4 or any other part that rotates with the disk 4 instead of being attached to the spindle 2. It is not necessary to use optical marks. Magnetic marks can be used. The magnetic marks can be formed on the surface of the disk 4.

The clock signal 52 is fed to a phase locked loop (PLL) 10, which produces as its output a reference clock signal 53. As will be appreciated by one skilled in the relevant art, there are many ways of implementing a PLL. Only one way will be described in detail in the following.

The PLL 10 generally extracts phase information from the clock signal 52 and modulates an oscillator clock signal 54 from a crystal oscillator 11 with the phase information to produce the reference clock signal 53. This is done by feeding back the reference clock signal 53 in a negative feedback loop. In this example, the reference clock signal 53 is first divided by a divide-by-n counter 12 to provide a divided reference signal 55. This division lowers the frequency to somewhere near the frequency of the clock signal 52. The clock signal 52 and the divided reference signal 55 are fed to a phase detector 13, which determines the phase difference between the two. The phase difference is expressed as a DC level at the detector output 56. This may be optionally filtered by a filter 14 to improve the performance of the PLL 10, as is known in the art. This filtered signal 57 is provided to a vector modulator 15 as a control signal. A vector modulator 15 has the filtered signal 57 as a first input. The crystal oscillator 11 produces the oscillator clock signal 54 which is also fed to the vector modulator 15. The vector modulator 15 is arranged to modulate the phase of the incoming oscillator signal 54 so that the phase difference between the divided reference clock signal 55 and the clock signal 52 derived from the motor 3 is reduced to or reduced towards zero.

Thus a reference clock signal 53 is generated that is modulated to take account of the fluctuations in the rotation of the disk 4 so as to be synchronised with the rotation of the disk 4.

Now, a number of standard tests made by a spinstand require using narrow band power measurements. One such test is the so-called "overwrite" test. This test involves writing a pattern of test data having a first frequency to a track on the disk 4 with the read/write head 6, and then subsequently overwriting this first pattern with a second pattern of test data having a different frequency. The track is then read back with the head 6, and the signal obtained is analysed to measure the residual signal power of the overwritten pattern at the first frequency. This is accomplished by a narrow band measurement system focussed on the first frequency. It is generally desirable that the narrow band measurement system is operable over a wide frequency range with good resolution so as to be flexible enough to work with different frequencies of the data patterns written to the disk in testing. In practice, a tuned spectrum analyser or apparatus similar thereto is commonly used to perform the signal analysis.

Because the residual signal power of the first frequency pattern is generally relatively low, it is necessary to use a measurement system with a high dynamic range in detecting and measuring the signal. In practice, this means that the spectrum analyser needs to have a low resolution bandwidth (RBW) for this purpose. As an example, next generation spinstands are specifying a RBW of down to 10 kHz. However, due to fluctuations in the speed of the motor both when writing the test data and when reading back the test data, the frequency content of the data signal ultimately read by the head can be distorted and spread. For example, for a typical motor speed error of ±0.001%, in the worst case there would be an error of ±0.002% in the frequency of the measurement signal (i.e., ±0.001% error when the pattern is written, and ±0.001% error when the pattern is read back). When this error is applied to a typical written frequency signal of 500 MHz, the read back frequency will vary by more than ±10 kHz in the worse case. Thus, it is becoming increasingly problematic to implement a RBW that is narrow enough to pick up the low level signal whilst coping with possible spreading of the frequency. Furthermore, this is a growing problem as the trend in the art is for the signal-to-noise ratio of modern heads 6 to become ever lower, meaning that it is necessary to further lower the width of the narrow band filter in the spectrum analyser. Also, next generation spinstand equipment is expected to operate with a written frequency of up to 2.5 GHz. Thus standard techniques are becoming increasingly inadequate.

Similar or equivalent problems caused by fluctuation in the spindle speed arise in other types of spinstand test.

In one embodiment, the reference clock signal 53 is fed to a pattern generator 16 and used as a timing reference for generating a test pattern of data 58. The test pattern of data 58 is then written to the disk 4 by the head 6. The spatial spreading of the test pattern of data 58 written to the disk 4 due to fluctuations in the rotation of the disk 4 is therefore reduced. Thus, when for example conducting an overwrite test as described above, this technique of generating a test pattern of data 58 may be used in writing the first frequency pattern of test data and/or the second frequency pattern of test data to the disk 4 in order to mitigate the problems of distortion and spreading of the written frequency.

The fluctuations in the rotation of the disk 4 will also affect the fidelity of the test data signal 59 (also known as the head signal 59) that is read back by the head 6. To mitigate the effects of this, in one embodiment, the analysis is performed on the test data signal 59 using the reference clock signal 53 as a timing reference so that the test data signal 59 is demodulated with the reference clock signal 53. Thus, again when conducting an overwrite test, this technique of analysing the test data signal 59 can be used to perform spectrum analysis on test data signal 59 to detect the residual signal power of the overwritten first frequency pattern of test data so as to further mitigate the problems of distortion and spreading of the written frequency when it is read back from the disk 4.

FIG. 2 shows an example of apparatus 20 for performing spectral analysis on the test data signal 59. The spectrum analyser 20 has an input stage that works on the "superheterodyning" principle. In this, the test data signal 59 measured by the head 6 is mixed with a selected frequency sine wave 60 in order to frequency shift the frequency of interest to an intermediate frequency (IF). In the present example, a tunable synthesiser 21 is used to generate the desired frequency 60. The test data signal 59 and the generated frequency 60 are fed to a mixer 22, where the signals are mixed in order to shift the frequency of interest to the IF. Alternatively, the tunable synthesiser can be linked to a sweep generator so as to perform a spectrum analysis across a frequency range of interest.

The shifted test data signal 61 is filtered by an IF filter 23 to remove unwanted heterodyning tones. The filtered signal 62 is then sampled and digitised by an analogue-to-digital converter (ADC) 24. The clock 63 for the ADC 24 is derived from the reference clock signal 53. The reference clock signal 53 is fed to a ADC clock synthesiser 25 which generates a clock signal 63 for the ADC 24 based upon the reference clock signal 53 as a timing reference. Thus the ADC 24 is clocked by the reference clock signal 53 and so the sampled signal 64 produced by the ADC 24 rejects frequency spreading due to fluctuations in the rotation of the disk 4.

The sampled signal 64 is then passed to a digital signal processing (DSP) system 30. A first-in-first-out buffer 31 (FIFO) is used as the input stage to the DSP system 30 and receives the sampled signal 64. The FIFO 31 preferably has protection for crossing asynchronous clock domains so that the DSP system 30 performing the processing can be clocked at a much higher rate than the sampling frequency of the ADC 24 to improve the latency of the analyser 20. The DSP system 30 also comprises a digital down-converter 32 which receives the sampled signal 64 from the FIFO 31 and then down-converts the sampled signal 64 to a baseband signal 65. This baseband signal 65 is passed through a low pass filter 33, which acts as a RBW filter. Finally, the filtered signal 66 is passed to a power detector 34, which measures the power in the signal 66, so that this can be recorded or displayed to the user.

Since the ADC sampling clock 63 is derived from the reference clock signal 53 modulated with the speed of rotation of the disk 4, the sampled signal 64 produced by the ADC 24 rejects frequency spreading due to fluctuations in the rotation of the disk 4. This means that the spectrum analyser 20 becomes normalised to disk speed.

Nonetheless, there are other ways in which the spectrum analyser 20 can be made normalised to disk speed. For example, instead of deriving the ADC sampling clock 63 from the reference clock signal 53, the super heterodyning frequency 60 can be derived from the reference clock signal 53. This also has the effect that the sampled signal 64 produced by the ADC 24 rejects frequency spreading due to fluctuations in the rotation of the disk 4, and so normalises the spectrum analyser 20 to disk speed.

In addition, referring to FIG. 1, the motor controller 40, which is used to control the rotation of the disk 4, is clocked by, or otherwise locked to, the same oscillator 11 that clocks the PLL 10. In this way, a single oscillator clock 54 is used as a reference for the entire testing apparatus 1,20 rather than having separate oscillator clocks in the apparatus. This avoids the effects of thermal drift between two separate clocks and therefore helps avoid a source of error entering the system, both when writing data to the disk 4 and when reading back and analysing data from the disk 4.

These are only some examples of how the reference clock signal 53 can be used as a timing reference for analysing the test data signal 59. Other forms are possible depending on the application.

Embodiments of the present invention have been described with particular reference to the examples illustrated. However, it will be appreciated that variations and modifications may be made to the examples described within the scope of the present invention.

The invention claimed is:

1. A method of testing at least one of a data storage disk medium and a read/write head, the method comprising:
   rotating the disk;
   detecting fluctuations in the speed of rotation of the disk by detecting with a sensor movement of a plurality of marks that rotate synchronously with the disk, the sensor being separate from the read/write head;
   producing a reference clock signal in accordance with said fluctuations so as to be synchronised with the rotation of the disk;
   generating a test pattern of data having a test frequency using said reference clock signal as a timing reference;
   writing the test pattern of data to the disk with the head;
   reading the test pattern of data from the disk with the head to provide a test data signal; and,
   analysing said test data signal using the reference clock signal as a timing reference to measure the narrow band power of said test data signal.

2. A method according to claim 1, wherein detecting the fluctuations comprises:
   producing a clock signal corresponding to the movement of the detected marks, said clock signal being used in the production of the reference clock signal.

3. A method according to claim 2, comprising providing the clock signal as an input to a phase locked loop, the phase locked loop being arranged to produce said reference clock signal.

4. A method according to claim 1, wherein analysing comprises spectrum analysing said test data signal.

5. A method according to claim 4, wherein spectrum analysing comprises converting said test data signal to an intermediate frequency by mixing said test data signal with a sinusoidal signal generated using said reference clock as a timing reference.

6. A method according to claim 4, wherein spectrum analysing comprises sampling and digitising the test data signal using an analogue-to-digital converter that is clocked by the reference clock.

7. A method according to claim 1, comprising:
   1) the disk being rotated by a motor that is locked to an oscillator clock signal; and,
   2) the reference clock signal being generated using an oscillator clock signal, the oscillator clock signal being modulated in accordance with the fluctuations in the speed of rotation of the disk in the generation of the reference clock signal,
   wherein the same oscillator clock signal is used for 1) and 2).

8. Apparatus for testing at least one of a data storage disk medium and a read/write head, the apparatus comprising:
   a spindle for rotating a said disk;
   a detector arranged to detect fluctuations in the speed of rotation of the disk by detecting with a sensor movement of a plurality of marks that rotate synchronously with the disk, the sensor being separate from the read/write head;

a processor arranged to produce a reference clock signal in accordance with said fluctuations so as to be synchronised with the rotation of the disk;

a pattern generator arranged to generate a test pattern of data having a test frequency using said reference clock signal as a timing reference;

a controller arranged to write the test pattern of data to the disk with a said head, and to subsequently read a test data from the disk with the head to provide a test data signal; and, a spectrum analyser arranged to analyse the test data signal using the reference clock signal as a timing reference to measure the narrow band power of said test data signal.

9. Apparatus according to claim 8, wherein the analyser comprises a mixer arranged to convert said test data signal to an intermediate frequency by mixing said test data signal with a sinusoidal signal generated using said reference clock as a timing reference.

10. Apparatus according to claim 8, wherein the analyser comprises an analogue-to-digital converter that is clocked by the reference clock and arranged to sample and digitise the test data signal.

11. Apparatus according to claim 8, comprising:

a decoder arranged to produce a clock signal corresponding to the movement of the detected marks, said clock signal being used in the production of the reference clock signal.

12. Apparatus according to claim 11, comprising a phase locked loop arranged to receive the clock signal as an input, the phase locked loop being arranged to produce said reference clock signal.

13. Apparatus according to claim 8, comprising:

an oscillator arranged to produce an oscillator clock signal;

a motor that is arranged to rotate the disk and is locked to the oscillator clock signal, wherein the processor is arranged to generate the reference clock signal using the oscillator clock signal by the oscillator clock signal being modulated in accordance with the fluctuations in the speed of rotation of the disk, the oscillator clock signal used by the motor and by the processor being the same.

* * * * *